April 2, 1968        O. E. SAARI        3,375,735

LIMITED SLIP DIFFERENTIAL MECHANISM

Filed Sept. 15, 1966

INVENTOR.
Oliver E. Saari
BY Barry L. Clark
Robert W. Heart
Attys

United States Patent Office 3,375,735
Patented Apr. 2, 1968

3,375,735
LIMITED SLIP DIFFERENTIAL MECHANISM
Oliver E. Saari, Elmhurst, Ill., assignor to Illinois Tool Works Inc., Chicago, Ill., a corporation of Delaware
Filed Sept. 15, 1966, Ser. No. 579,732
8 Claims. (Cl. 74—711)

This invention relates to limited slip or inefficient differentials of the planetary gear type, and more particularly to a means of introducing an initial breakaway torque into such a differential to give it a limited slip characteristic and decrease its efficiency.

The transmission of torque to drive wheels, generally two in number, so that each wheel can have a different speed of rotation relative to the other, requires the use of a differential mechanism. The differentation between wheels which it makes possible, provides for transmission of power to both wheels while the vehicle is turning a corner, for example, during which time relative motion is required to eliminate what would otherwise be wheel bounce or skidding caused by unequal distances traveled by the two wheels. However, in permitting such differentiation under different relative wheel speeds, conventional differentials also permit one wheel to spin if that wheel possesses relatively less tractive ability (such as provided by ice or mud) than that of the other drive wheel. The total tractive ability of the vehicle is then essentially limited to the tractive effort of the least tractive wheel.

Many methods and means of restricting such relative rotation under slippery conditions have been developed, these including systems which completely lock the wheel having the least tractive ability, systems where the differential gears are locked for movement with their case when the relative movement between the gears and cases exceeds a predetermined amount, and the use of overrunning clutching means to introduce friction in various ways. Generally, these devices have not found widespread application in differential construction because of the added expense of using special manufacturing techniques in producing a complicated design. Many devices utilizing clutches have a relatively short useable life since they wear quite rapidly and are difficult to lubricate properly. In certain forms of differentials, there is often reduced strength and reliability introduced.

Accordingly, it is an object of this invention to provide a differential of a spin limiting sort tending to reduce relative motion between two axles when the wheels on the axles engage surfaces of widely differing coefficients of friction—without impairment to efficient transmission of power in the absence of differentiation requirements.

A further object of this invention is to provide a simple, inexpensive slip limiting differential.

A still further object of this invention is to increase the spin limiting properties of a differential of the type disclosed in co-pending application, Ser. No. 363,934, filed Apr. 30, 1964, now Pat. No. 3,292,456, wherein inefficiency is derived from the friction caused by mounting the pinions loosely in bearing pockets.

Another object of the invention is to increase the spin limiting properties of a differential having spring biased pinions such as disclosed in co-pending application Ser. No. 579,730 filed on the same day as the present application in the name of Gary Vesey.

These and other related objects are achieved in the present invention by the use of a ring shaped spring member in differentials of the side or sun gear and meshing pinion or planetary gear variety, the spring member being mounted relative to at least one pinion gear so as to exert a radial compressive force thereon and thus oppose the rotation of the gears relative to their bearing supports and the differential case.

The present invention is broadly related to the invention set forth in great detail in the previously referenced applications assigned to a common assignee, in that in both cases, friction and rubbing are relied upon to increase the inefficiency of a differential. However, in the instant invention, the frictional force is derived mainly from the application of a resilient radial compressive force to the gears, such as by the use of a spring ring member to cause one or more gears to rub against a portion of its bearing supports. Since spring dimensions and properties can be chosen which will exert different degrees of compressive force, it is obvious that the inefficiency of the differential can be varied over a large range. Although the applications previously referred to teach many means for obtaining an inefficient differential, the present invention permits an increase to be made in the inefficiencies of such differentials.

When a radial bias is applied to any of the pinions in the differential of the present invention, the pinion teeth become frictionally engaged with the walls of the housing as well as with the spring ring member. Since the coefficient of friction is much greater when the gears are stopped as compared to when they are moving, it can be seen that the present differential will prevent one wheel of a vehicle from moving relative to the other until a predetermined breakaway torque is exceeded. Thus, when a vehicle is just starting to move out of a location where one wheel is in engagement with a surface offering little resistance to slip, a large amount of torque can still be transferred to the other wheel to help get the vehicle moving. Although the pinions are shown to be movable into contact with the differential case, they could also be mounted on axles with a consequent loss of inefficiency.

Further detailed description of the invention can be had by reference to the drawings in which.

Figure 1:
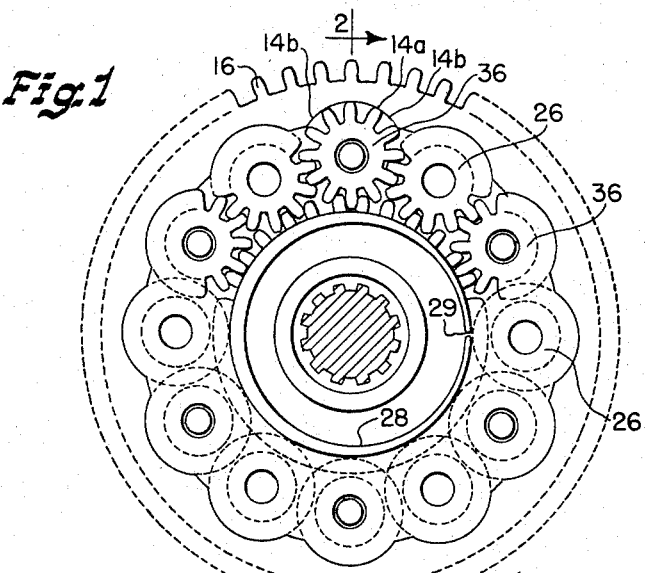
FIG. 1 is an axial view with the right cover and side gear removed taken along lines 1—1 of FIG. 2.
Figure 2:
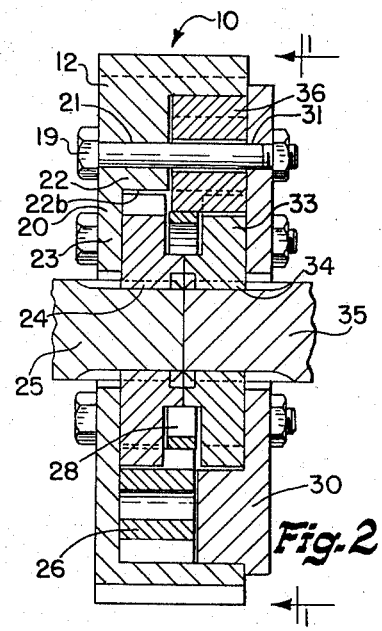
FIG. 2 is an axial section of that form of the invention shown in FIG. 1, this section taken along lines 2—2 of FIG. 1.
Figure 3:
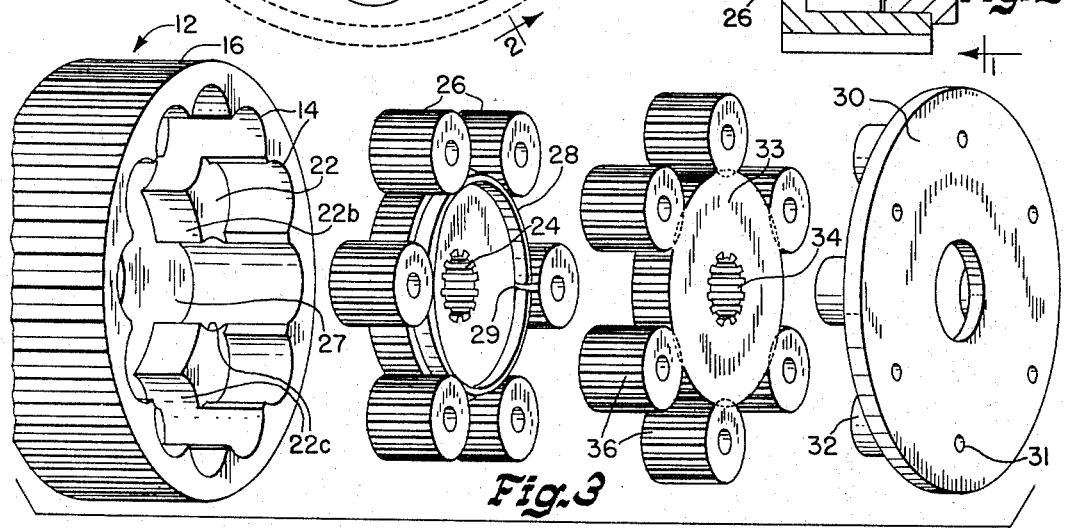
FIG. 3 is an exploded assembly of the component parts of the same embodiment of the invention shown in FIGS. 1 and 2.

FIGS. 1-3 show the preferred embodiment of my differential 10. Referring particularly to FIG. 3, the differential includes a differential case member 12 which has internal escalloped pinion supporting walls 14 whose purpose will be described later. The differential case 12 preferably has formed on its exterior peripheral surface, an integral ring gear 16 having teeth adapted to receive the engine torque which the differential then transmits to a pair of axles connected to it. It is to be understood that the ring gear is merely representative of one form of gearing which could be used to transmit torque. In addition to gearing, it would of course also be possible to employ other methods of transmitting power to the differential case 12 such as by belts and pulleys for example.

The differential case member 12 has holes 21 (FIG. 2) formed therein for receiving fastening means such as bolts 19. The differential case 12 includes a left end portion 20 having a plurality of bosses 22 formed integrally therewith. These bosses 22 extend for a limited axial distance toward the center of the differential case 12. The inner peripheries 22b of the bosses 22 are spaced radially away from the center of the end portion 20 an amount sufficient to permit a left side or sun gear 23 to be positioned in contact with the inner flat surface of the left end surface 24 adapted to be placed in driving relationship with the left splined axle 25 (FIG. 2). A plurality of left pinion or planet gears 26 are in an orbit and are spaced evenly about the interior of the differential case in left pinion pockets 27 defined by the left end portion 20 and the peripheral side walls 22c of the bosses 22. The pinions have relatively large holes through their centers to accommodate fastening bolts 19 and permit the pinions to move in a plane without interference from the bolts. The pinions 26 are mounted in pockets 27 and held in pressure contact with the escalloped pinion supporting walls 14 by a biasing means such as a spring ring 28 which is split at 29 for a purpose herein after described.

The right side of the differential comprises a cover 30 for the differential case 12. Since the cover 30 is shaped on its inner portions in a manner similar to left end portion 20, the elements thereof have been numbered so that the second digit of the reference characters are the same as those used to describe the left side. Thus, the right hand portion of the differential includes right end cover portion 30 which is similar to left end portion 20 and adapted to be drawn towards end portion 20 by fastening means such as bolts or rivets 19 passing through holes 31, 21. The right end of the differential includes bosses 32, a right side or sun gear 33 having an internal splined surface 34, and a set of right pinion or planet gears 36 positioned in pockets formed by the end portion 30 and the bosses thereon. The pinions 36 are held in pressure contact with the escalloped pinion supporting walls 14 by spring ring 28.

It is evident in FIGS. 1 and 2 that the pinions 26, 36 mesh with each other in a full circle of engagement. However, it should be noted that adjacent pinions are only in mesh with each other for a short portion of their axial length near the center of the differential. The remainder of the axial length of pinions 26 is in mesh with left side gear 23 while the remainder of the axial length of right pinion gears 36 is in meshing engagement with right side gear 33. This arrangement of partial engagement is necessary if the gears are to act as a differential and would allow a clockwise movement of gear 33 in FIG. 3 to be transmitted to pinions 36, and then from pinions 36 to pinions 26 which in turn would drive left side gear 23 in a counterclockwise direction.

Figure 4:
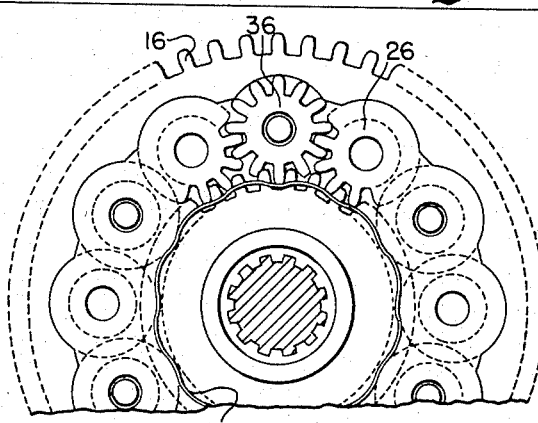
FIG. 4 is a partial axial view similar to FIG. 1 of a second form of differential contemplated by this invention.

Another representative form of differential mechanism to which the concepts of this invention are applicable is the differential mechanism shown in FIG. 4. This embodiment of the invention is identical to that shown in FIGS. 1-3 with the exception that a continuous thin spring ring 46 is used for biasing the pinions 26, 36 into contact with the bearing walls 14. The ring 46 has an outer normal diameter greater than the smallest diameter of a circle defined by the locus of its radial points of tangential contact with the pinions 26, 36. Due to its large normal diameter, the ring 46 must be deformed within its elastic limit into an undulating shape such as is seen in FIG. 4. The ring will exert a relatively constant radial bias force against the pinions to cause them to be subjected to friction forces at their points of contact with the ring and with the bearing walls 14 of the case 12. Since the pressure exerted by the continuous spring ring 46 decreases with wear of the ring and pinions and varies depending on the initial tolerances and fit between the several mating parts, the continuous ring embodiment has been found to be somewhat less desirable than the split ring which can undergo substantial changes in diameter with little consequent effect on the radial compressive force applied to the pinions 26, 36.

In the embodiments described, the spring rings 28 or 46 are positioned coaxially with the side gears 23, 33 so as to act on the pinions in an inner circle of radial contact. However, it is to be understood that the spring rings could be made smaller so as to engage a single pinion and a shoulder on the side gears. Furthermore, although the split spring ring 28 is shown in FIGS. 1-3 as biasing the pinions outwardly, a similar ring could be positioned externally of the pinions. Such an external positioning would be particularly effective if the supporting walls 14 were made to face outwardly.

Whatever the positioning and the numbers of spring rings that may be used, it is necessary that the rings be under stress. In the embodiments disclosed in FIGS. 1-4 the stress is compressive, the amount of compression being obtained by selection of a suitable overall radial thickness of the ring, by the diametral size of the space in which it is confined as compared to the normal diameter of the ring, and by the choice of material from which the spring ring is formed. An alloy steel known as 4140, hardened to approximately 55 Rc, has been found to be suitable for the rings. For a ring diameter of about 2.5 inches, a thickness of about .015 in. is satisfactory for the embodiment of FIG. 4, while an average thickness of about .100 in. has been found satisfactory for the embodiment of FIGS. 1-3.

In order to achieve a substantial equal compressive force on the pinions at any point on the periphery of the split ring 28, the ring may have a varying wall thickness which is thicker at points spaced from the split than it is at the split. One way to approximate this condition is to punch out the ring with circular punches which have their centers offset.

A major advantage of the split ring embodiment of FIGS. 1-3 is its ability to accommodate for wear and manufacturing tolerances while only slightly varying the pressure applied to the pinions. In this respect, the split spring ring is superior to the continuous spring ring of FIG. 4 or to the use of axially compressed spring washers. With the latter two types of springs, physical properties of the spring restrict the amount of compression possible so that small changes caused by wear or tolerance will result in large changes in the force exerted by the spring. For example, if the inner diameter across the pinions 26, 36 in FIG. 4 is 2.50 inches while the outer normal diameter of the ring is .010 greater or 2.51 in., a decrease in the diameter of individual pinions of .003 in., through either wear or manufacturing tolerance, would result in a 60 percent (.003+.003/.010) reduction in the compressive force being applied by the ring to the pinions. Similarly, the wearing away of .006 in. of an axial spring washer or the parts associated therewith would result in a 60 percent reduction in the pressure being applied if such a washer achieves its full compression by being depressed .010 in.

Since the spring ring 28 is split, it can have a normal diameter much greater than the diameter across the inner points of the pinions and still stay within its elastic limit when compressed between the pinions. For example, a spring having a normal diameter of 2.700 in. compressed to a diameter of 2.500 in. would have 20 times the wear and tolerance absorbing ability of the continuous spring ring example previously referred to. Whereas a change in ring diameter of .006 in. in the previous (continuous ring) example resulted in a 60 percent loss of compressive force, a change of .006 in. in the present example would only reduce the force by 3 percent, i.e., .006/.200. It should be noted that the preceding examples are illustrative only and that the rings may be compressed different amounts as long as the elastic limit of the spring material is not exceeded.

To permit assembly of the ring to the differential and avoid any possibility that the split ends will enter a tooth space in the pinions, the ends of the ring are rounded and the width of the cut-out portion at the split is chosen so that the ends of the ring will almost touch when first installed.

From the preceding description it will be readily evident that the present invention provides a limited slip or inefficient differential which offers a resistance to the rotation of the pinion gears relative to the case. The differential is thus capable of resisting torque applied to the pinions by a side gear attached to an axle which has a slipping wheel on it. Since the torque from the slipping wheel is resisted, a much greater torque is applied to the wheel which is not slipping.

By inserting a spring ring in radial compressive engagement with the pinions, a constant friction force is made to exist between the pinions and the outer walls of the case directly opposite the ring. A friction force will also exist between the ring and the pinions since adjacent meshed pinions will tend to drive the ring in opposite directions.

In addition to the friction forces caused by the spring ring, the pinions will also exert increasing pressures against the walls of the case at one of the points 14b in response to increasing torque loads carried by the pinions. These latter pressures are offset at an angle to the pressures caused by the ring since they are derived from the tangential engagement of the pinions by the side gears. The friction forces caused by these pressures will act at one side 14b or the other of each wall groove depending on the direction in which the pinions are being driven by the side gear.

While the invention has been particularly shown and described with reference to several embodiments thereof, it will be understood by those skilled in the art that various changes in form and details may be made therein without departing from the spirit and scope of the invention.

What is claimed is:
1. A limited slip differential comprising:
rotatable differential case means;
a pair of side gears in said case adapted to be operatively engaged by a pair of axles entering opposite sides of said case;
a plurality of first pinion gears in a first orbit in meshing engagement with one of said pair of side gears;
a plurality of second pinion gears in a second orbit in meshing engagement with the other of said pair of side gears;
at least one of said first pinions being in meshing engagement with at least one of said second pinions;
bearing means for mounting said gears in the case means, and resilient biasing means comprising at least one spring ring member positioned to exert a radial compressive force against at least one of said pinion gears to provide a friction force between the spring ring and the pinion gear and between said gear and its bearing;
said friction forces serving to dissipate torques transmitted to said side gears by the axles and thereby oppose the rotation of said gears relative to the differential case.

2. A limited slip differential according to claim 1 wherein said spring ring member is split so as to permit its outer diameter to be changed to facilitate its assembly in said differential and to accommodate variations in dimensions due to production tolerances and wear.

3. A limited slip differential according to claim 2 wherein the spring ring member has a varying radial annular thickness to permit the ring to apply a substantially constant compressive force to a pinion at any point on its periphery.

4. A limited slip differential according to claim 1 wherein said spring ring is positioned coaxially with the side gears and is in engagement with all of the pinions in at least one of said orbits.

5. A limited slip differential according to claim 4 wherein:
said spring ring is continuous and has an outer diameter which is greater than the smallest diameter of a circle defined by its points of contact with the engaged pinions;
said spring ring having a relatively thin radial thickness permitting it to be deformed within its elastic limit by contact with said pinions so as to assume an undulating shape which partially surrounds the periphery of said pinions.

6. A limited slip differential according to claim 4 wherein said spring ring frictionally engages all of the pinions in the first and second orbits and absorbs frictional forces between the ring and pinions which are introduced by the tendency of the pinions in the first orbit to rotate the ring in a direction opposite to that produced by the simultaneous rotation of the pinions in the second orbit.

7. A limited slip differential according to claim 5 wherein said spring ring frictionally engages all of the pinions in the first and second orbits and absorbs frictional forces between the ring and pinions which are introduced by the tendency of the pinions in the first orbit to rotate the ring in a direction opposite to that produced by the simultaneous rotation of the pinions in the second orbit.

8. A limited slip differential in accordance with claim 6 wherein said rotatable differential case comprises rotatable carrier means:
said bearing means including partially cylindrical wall portions for supporting said pinions and located interiorly of said rotatable carrier means;
said pinion supporting walls adjacent each pinion including a first section diametrically opposite the region on the pinion which is engaged by the spring ring, and at least one other section adjacent said first section, said first sections being engaged by said pinions with a substantially constant friction force due to the compressive force applied to the pinions by the spring ring; and
said first and other sections each being subjected to additional friction forces which increase in proportion to increases in the torque transmitted from one side gear to the other through the pinions.

References Cited

UNITED STATES PATENTS

| 1,203,085 | 10/1916 | Wallace | 74—710.5 |
| 1,229,548 | 6/1917 | Van Sant et al. | 74—711 |
| 2,785,588 | 3/1957 | Sampietro | 74—711 |
| 2,786,366 | 3/1957 | Tallakson | 74—711 |
| 2,972,265 | 2/1961 | Walter | 74—711 |

FRED C. MATTERN, JR., *Primary Examiner.*

ARTHUR T. McKEON, *Assistant Examiner.*

UNITED STATES PATENT OFFICE
CERTIFICATE OF CORRECTION

Patent No. 3,375,735 April 2, 1968

John Oliver E. Saari

It is certified that error appears in the above identified patent and that said Letters Patent are hereby corrected as shown below:

Column 2, line 69, after "left end surface" insert -- 20. The side gear 23 includes an internal splined surface --.

Signed and sealed this 26th day of August 1969.

(SEAL)
Attest:

Edward M. Fletcher, Jr.  WILLIAM E. SCHUYLER, JR.
Attesting Officer                  Commissioner of Patents